United States Patent
Preston

(10) Patent No.: US 6,856,576 B2
(45) Date of Patent: Feb. 15, 2005

(54) METHOD FOR DETERMINING ECHO DISTANCE USING AUTOCORRELATION IN TIME OF FLIGHT RANGING SYSTEMS

(75) Inventor: Nigel Ashley Preston, Peterborough (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 0 days.

(21) Appl. No.: 10/674,868

(22) Filed: Sep. 29, 2003

(65) Prior Publication Data

US 2004/0179428 A1 Sep. 16, 2004

(30) Foreign Application Priority Data

Sep. 27, 2002 (CA) .............................................. 2405656

(51) Int. Cl.[7] .......................... G01S 15/08; G01F 23/00
(52) U.S. Cl. ........................ 367/99; 367/908; 73/290 V
(58) Field of Search ........................... 367/40, 99, 100, 367/908; 73/290 V; 342/123, 124

(56) References Cited

U.S. PATENT DOCUMENTS

| | | | | |
|---|---|---|---|---|
| 4,248,087 A | * | 2/1981 | Dennis et al. | ............. 73/290 V |
| 5,793,704 A | * | 8/1998 | Freger | ......................... 367/908 |
| 5,872,507 A | * | 2/1999 | Weber et al. | .................. 367/99 |
| 6,122,602 A | * | 9/2000 | Michalski et al. | ............ 367/99 |
| 6,434,085 B1 | * | 8/2002 | Nedwell | ....................... 367/99 |

* cited by examiner

Primary Examiner—Ian J. Lobo
(74) Attorney, Agent, or Firm—Townsend and Townsend and Crew LLP

(57) ABSTRACT

A method and system for echo processing a receive signal using autocorrelation. A receive signal is sampled, digitized and high-pass filtered. A correlation signal is created by adding the filtered signal to a copy of the filtered signal shifted by a time unit. A set of correlation signals is created by repeating the process for a range of time units corresponding to a set of sequential sample points. Each correlation signal has a correlation indicator evidencing the strength of the correlation. The correlation signal having the highest correlation strength is identified, and the time shift used to create it is identified as the time of flight of the echo pulse. The echo distance is then calculated based upon the time of flight and the speed of propagation of the echo in the environment. The correlation indicator may the maximum peak value of the correlation signal.

16 Claims, 6 Drawing Sheets

METHOD FOR DETERMINING ECHO DISTANCE USING AUTOCORRELATION IN TIME OF FLIGHT RANGING SYSTEMS

FIELD OF THE INVENTION

The present invention relates to, level measurement systems, and more particularly to a method for determining echo distance using autocorrelation in pulse-echo acoustic ranging and time of flight ranging systems.

BACKGROUND OF THE INVENTION

Pulse-echo ranging systems are widely used to recognize the presence of an object by measuring the time interval between the transmission of a sonic or electromagnetic pulse towards the object and the reception of reflected echo signals over a distance. Systems of this kind generally have a transducer serving the dual role of transmitting and receiving pulses, and a signal processor for detecting and calculating the position or range of the object based on the transit times of the transmitted and reflected signals.

The transducer employed in an acoustic pulse-echo ranging system typically includes an electromechanical vibrating element that functions as both a transmitter and a receiver. Using the same transducer for transmitting as well as receiving is advantageous because the transducer will exhibit the same resonance frequency and the same directional characteristics in both transmit and receive modes. In transmit mode, the transducer is excited with an input voltage signal, which results in the emission of a characteristic burst of, for example, acoustic energy. In receive mode, the reflected energy or echo pulse causes the resonator element to vibrate and generate a low amplitude electrical signal output.

A problem in pulse-echo ranging systems is the susceptibility of the transducer to decay or "bringing down" oscillations of the resonator element as a result of stored energy being released by the transducer after excitation. The ringing down problem tends to severely limit the sensitivity of the transducer to detect a true or actual echo pulse. This loss in sensitivity is particularly acute when the echo pulse has a low amplitude relative to the ring down pulses of the transducer, and also when the reflective surface (i.e. object) is close to the transducer. When the reflective surface is close to the transducer, an echo may be received within a short period of time and may be lost in the ringing down oscillations.

Accordingly, there remains a need for a method and system for determining echo distance that addresses the problem of ringing down oscillations.

BRIEF SUMMARY OF THE INVENTION

The present invention provides a method and system for determining echo distance using autocorrelation in level measurement systems.

In one embodiment, the method includes creating a set of correlation signals from a receive signal, each correlation signal indicating the correlation strength between the receive signal and a copy of the receive signal which is shifted. The magnitude of the shift involved in creating the correlation signal having the greatest correlation strength is used to determine the occurrence of an echo pulse and, thus, the echo distance.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made to the accompanying drawings, which show, by way of example, an embodiment of the present invention, and in which.

DETAILED DESCRIPTION OF THE EMBODIMENTS

Figure 1:
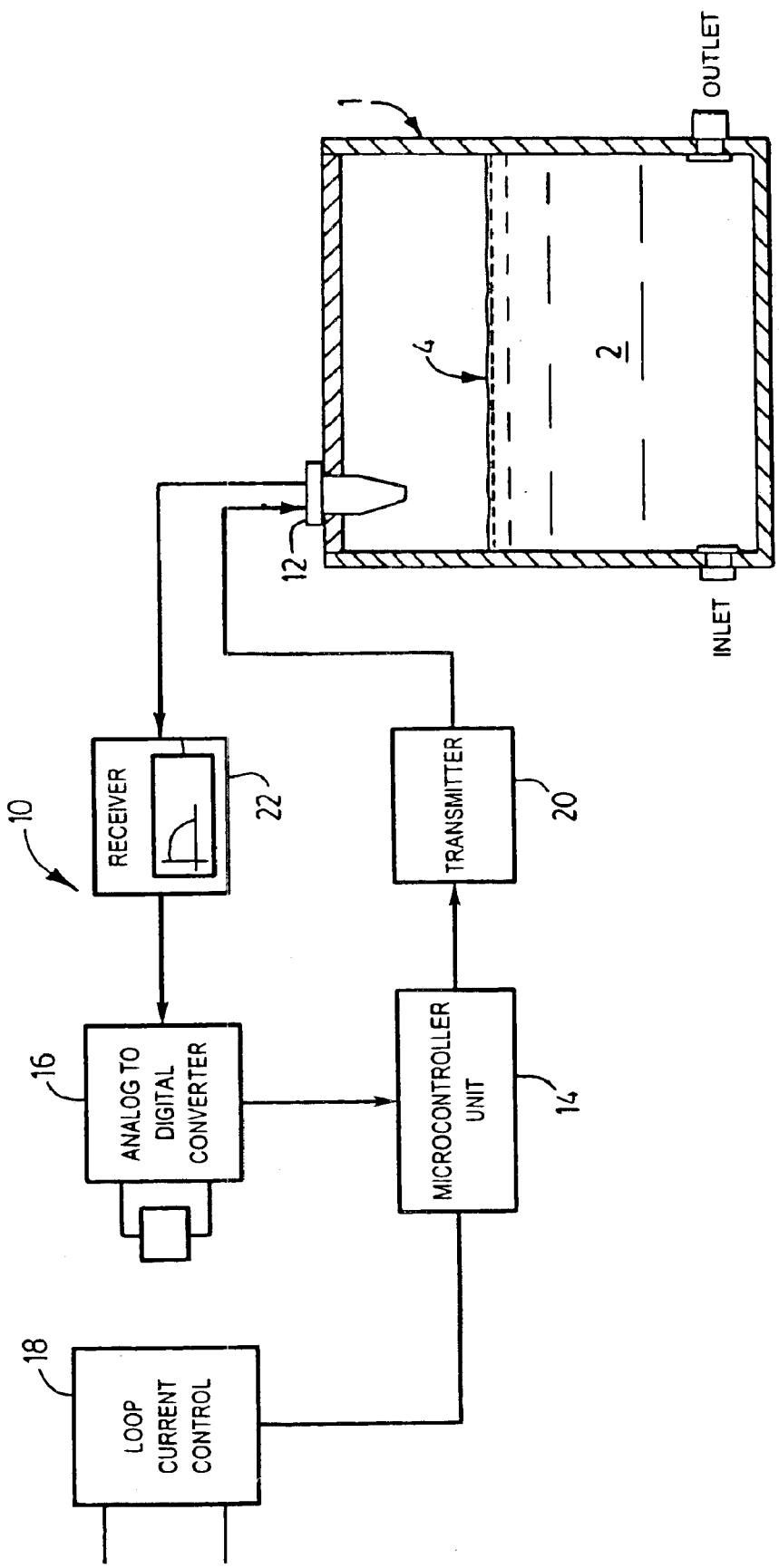
FIG. 1 shows in diagrammatic form a pulse-echo acoustic ranging device for determining echo distance using autocorrelation according to the present invention.

Reference is first made to FIG. 1, which shows in diagrammatic form an ultrasonic pulse-echo acoustic ranging device 10 for determining echo distance using autocorrelation, in accordance with the present invention.

As shown in FIG. 1, the pulse-echo acoustic ranging device 10 comprises an ultrasonic transducer 12, a microcontroller unit 14, an analog-to-digital converter 16, and a current (4–20 mA) loop interface module 18. The transducer 12 is coupled to the microcontroller unit 14 through a transmitter stage 20. The microcontroller unit 14 uses the transmitter stage 20 to excite the transducer 12 to emit ultrasonic pulses. Reflected or echo pulses are coupled by the transducer 12 and converted into a received electrical signal in a receiver stage 22.

The ultrasonic pulse-echo ranging device 10, i.e. the ultrasonic transducer 12, is installed in a tank 1 containing a liquid 2 with a level determined by the top surface of the liquid 2. The top surface of the liquid 2 provides a reflective surface or reflector, indicated by reference 4, which reflects the ultrasonic pulses generated from the emitter on the transducer 12. The reflected ultrasonic pulses are coupled by the transducer 12 and converted by the receiver 22 into electrical signals. The A/D converter 16 samples and digitizes the receive signal to produce a sampled receive signal 102 (FIG. 2) for further processing by the microcontroller unit 14. The microcontroller unit 14 executes an algorithm which identifies and verifies the echo pulse and calculates the range of the reflective surface 4, i.e. the time it takes for the reflected ultrasonic pulse to travel from the reflective surface 4 to the receiver on the transducer 12. From this calculation, the distance to the surface of the liquid 4 and thereby the level of the liquid is determined. The microcontroller 14 also controls the transmission of data and control signals through the current loop interface 18. The microcontroller 14 is suitably programmed to perform these operations as will be within the understanding of those skilled in the art.

Figure 2:
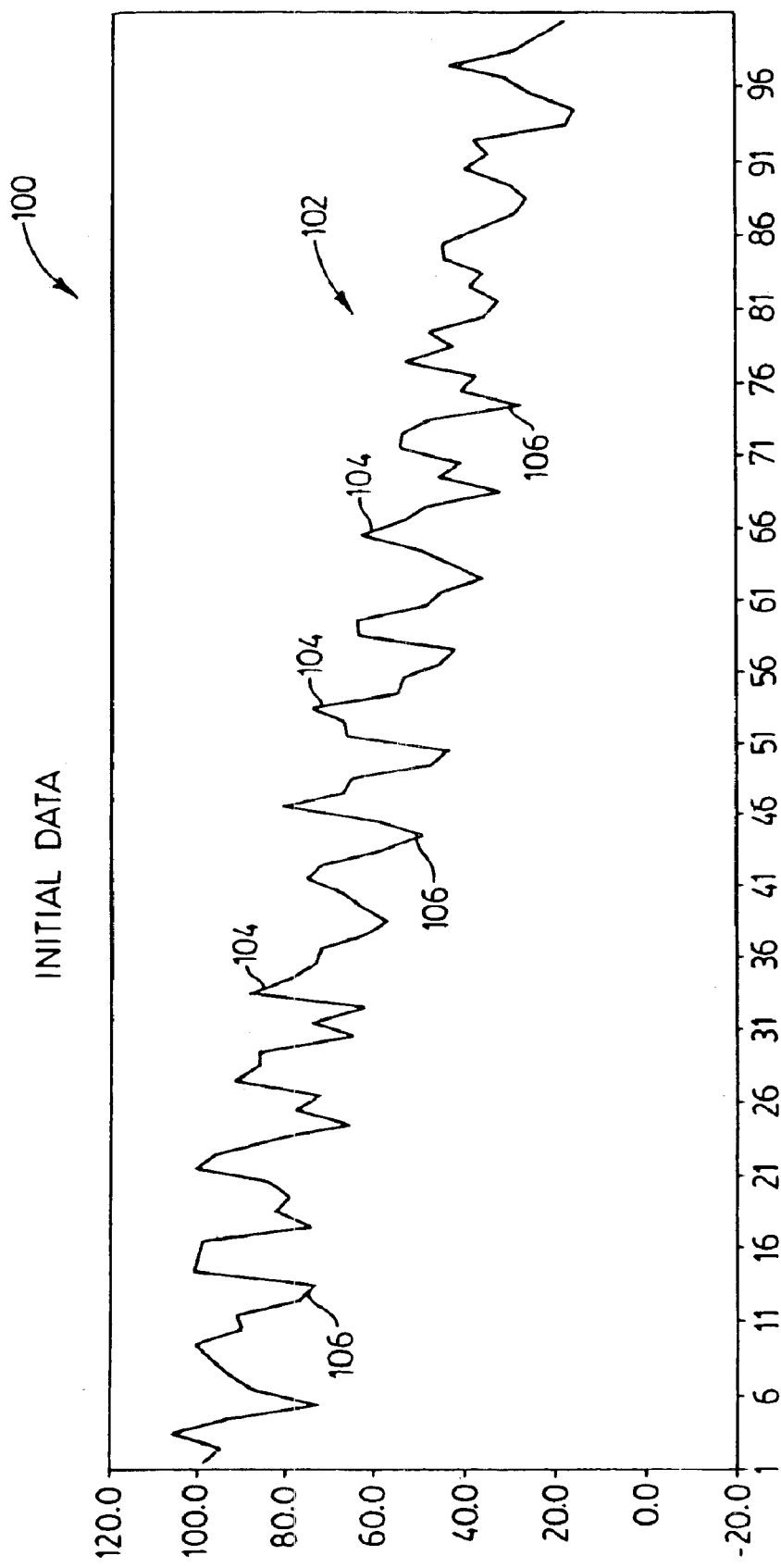
FIG. 2 shows a graph of the amplitude of a sampled receive signal over time.

Reference is now made to FIG. 2, which shows a graph 100 of the amplitude of the sampled receive signal 102 over time. Note that the sampled receive signal 102, as depicted in the graph 100, is a discrete signal defined by an amplitude value at each unit of time. In the embodiment described herein, the signal received by the microcontroller 14 from the A/D converter 16 is a digital signal containing data representing the discrete signal.

As is depicted in the graph 100, the sampled receive signal 102 includes a plurality of peaks 104 and troughs 106. One or more of the peaks 104 may represent a echo of the transmitted pulse off of the reflective surface 4 (FIG. 1) that has been received by the transducer 12 (FIG. 1). Higher order echoes may also be present in the sampled receive signal 102 at later times. The higher order echoes are generated as the first-received echo pulse is reflected off the transducer 12 and back to the reflective surface 4, where it is again reflected back to the transducer 12.

It will be appreciated that not each of the peaks 104 shown in the graph 100 of the sampled receive signal 102 is necessarily a reflected pulse sensed by the transducer 12 (FIG. 1). Many of the peaks 104 and troughs 106 may result from ringing down in the transducer 12 or other system noise. Accordingly, the microprocessor 14 (FIG. 1) processes the sampled receive signal 102 following its digitization by the A/D converter 16 (FIG. 1), in order to identify the echo pulses.

The sampled receive signal 102 also exhibits a DC offset and a low frequency decay over time. In order to perform echo processing upon the receive signal 102, the microprocessor 14, under firmware program control, first high-pass filters the sampled receive signal 102 to reduce or remove the DC and low frequency components. The suitable programming of the microprocessor 14 will be understood by one of ordinary skill in the art upon reviewing the functions described below.

Figure 3:
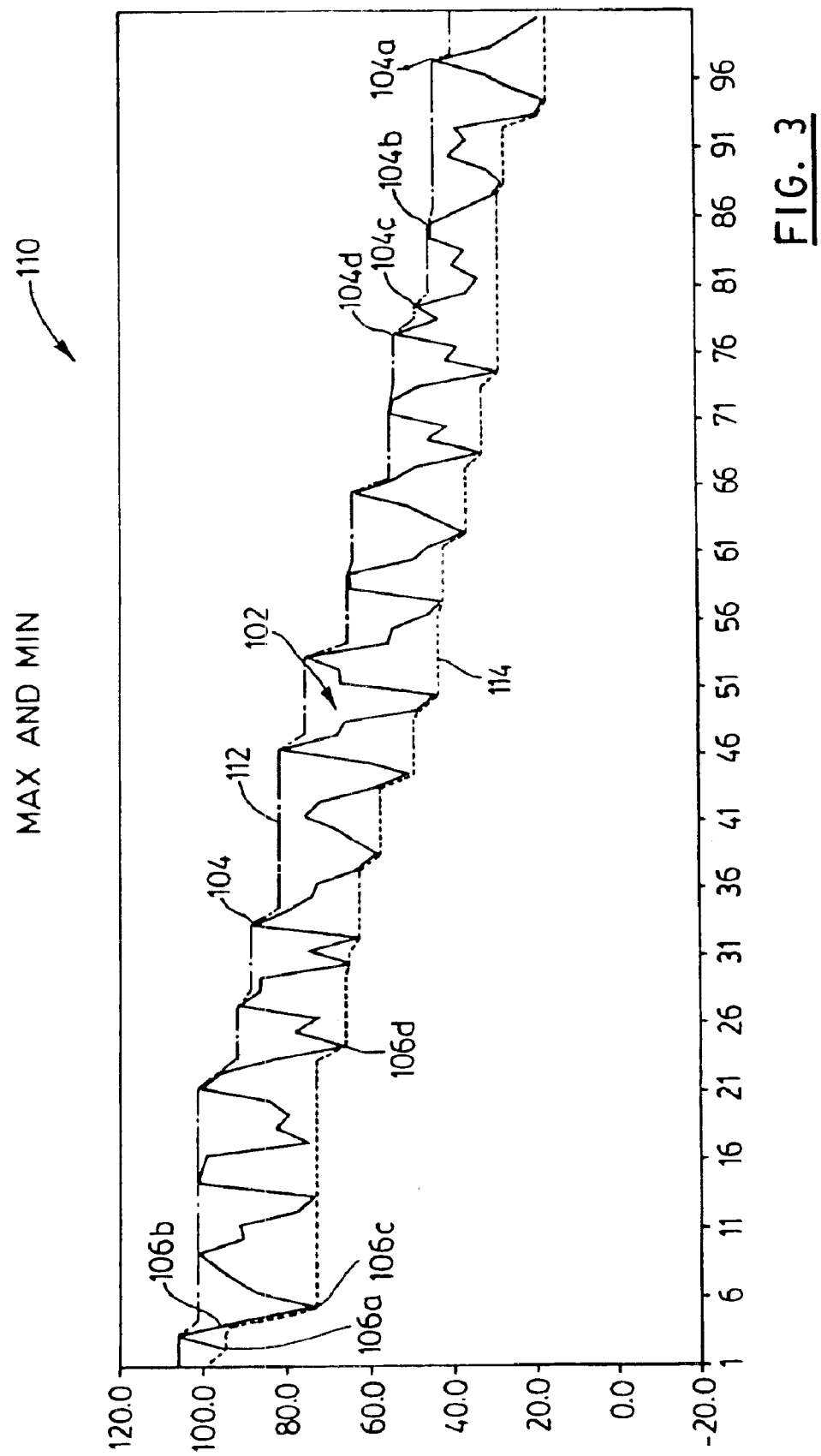
FIG. 3 shows a graph of the amplitude of the sampled receive signal over time.

Reference is now made to FIG. 3, which shows a graph 110 of the amplitude of the sampled receive signal 102 over time. Also shown in the graph 110 is a maximum signal profile 112 and a minimum signal profile 114. The maximum signal profile 112 follows the upper envelope of the sampled receive signal 102. Similarly, the minimum signal profile 114 follows the lower envelope of the sampled receive signal 102.

The maximum signal profile 112 may be generated beginning with a last peak 104*a* in the sampled receive signal 102. The amplitude of the maximum signal profile 112 is set at the value of the amplitude of the last peak 104*a* and maintains that amplitude until, moving backwards in time, the sampled receive signal 102 has an amplitude higher than the last peak 104*a*. This occurs at peak 104*b* for the sampled receive signal 102 in FIG. 3. Thereafter, the maximum signal profile 112 has an amplitude corresponding to the amplitude of peak 104*b*, which it maintains until peak 104*c*, and peak 104*d*, and so on. In this manner the maximum signal profile 112 traces the upper envelope of the sampled receive signal 102.

The minimum signal profile 114 may be generated beginning with a first trough 106*a* in the sampled receive signal 102. The amplitude of the minimum signal profile 114 is set at the value of the amplitude of the first trough 106*a* and maintains that amplitude until the sampled receive signal 102 dips below that amplitude, which it does at trough 106*b*. The minimum signal profile 114, therefore, traces the lower envelope of the sampled receive signal 102 connecting troughs 106*a*, 106*b*, 106*c*, 106*d*, and so on.

The task of generating of a maximum signal profile 112 and a minimum signal profile 114 is performed by the microprocessor 14 (FIG. 1). The microprocessor 14 (FIG. 1) may operate under the program control of firmware suitably programmed to implement the functions described above. The above-described embodiment generates the maximum and minimum signal profiles 112 and 114 using simple non-intensive computational steps, such as compares between a maximum (or minimum) value and the sampled receive signal 102 values. As the microprocessor 14 steps through the samples, it adjusts the maximum (or minimum) value whenever the sampled receive signal 102 exceeds it, thereby tracking the envelope of the sampled receive signal 102.

The generation of a maximum or minimum signal profile 112 and 114 may be performed using other envelope or peak detection steps. The profiles 112 and 114 may also be generated by other components, rather than the microprocessor 14, such as by dedicated digital circuitry coupled to the A/D converter 16. The profiles 112 and 114 may also be generated in analog form from the unsampled receive signal using analog circuitry to implement an envelope or peak detection circuit.

Figure 4:
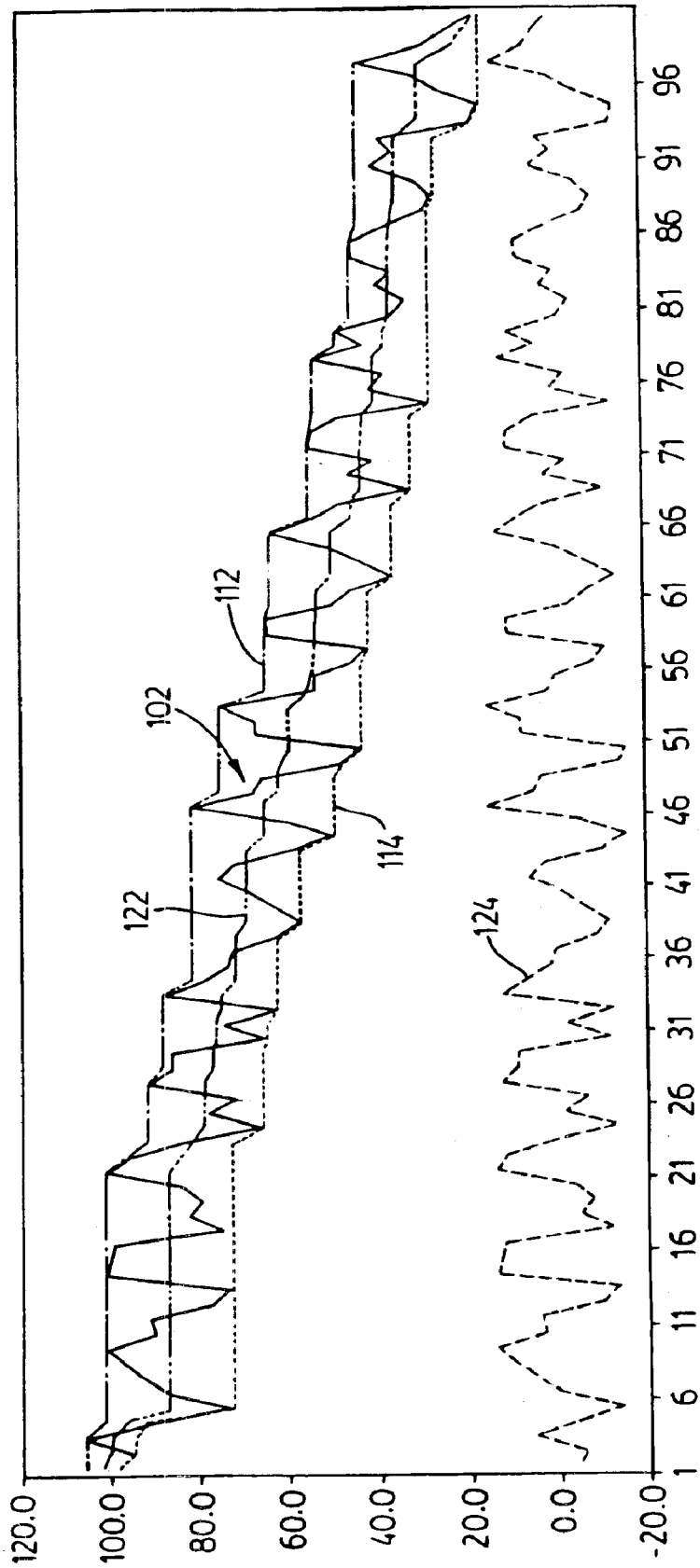
FIG. 4 shows a graph of the amplitude of various plots generated from the sampled receive signal.

Reference is now made to FIG. 4, which shows a graph 120 of the amplitude of various plots generated from the sampled receive signal 102. In addition to the sampled receive signal 102, the maximum signal profile 112, and the minimum signal profile 114, the graph 120 shows a midpoint reference signal 122. The midpoint reference signal 122 is generated as the average amplitude value of the maximum signal profile 112 and the minimum signal profile 114 on a point-by-point basis.

The midpoint reference signal 122 serves as a calculation of the offset by which the sampled receive signal 102 can be corrected so as to filter DC and low frequency components out. Accordingly, the graph 120 also shows a filtered signal 124. The filtered signal 124 is generated by subtracting the midpoint reference signal 122 from the sampled receive signal 102. The filtered signal 124 may then be processed for echo detection.

Like the generation of the maximum and minimum signal profiles 112 and 114, the generation of the midpoint reference signal 122 and the filtered signal 124 in the above-described embodiment is performed by the microprocessor 14 (FIG. 1) under firmware control. The calculation of the midpoint reference signal 122 is computationally straight forward in that the corresponding sample values of the maximum signal profile 112 and the minimum signal profile 114 are added together and the result is divided by two. In one embodiment, the division is implemented as a one-bit shift operation. The resulting average sample values constitute the midpoint reference signal 122.

The filtered signal 124 is then generated by subtracting each midpoint reference signal 122 sample value from its corresponding sampled receive signal 102 sample value. The resulting set of values constitutes the filtered signal 124.

As with the profiles 112 and 114, the averaging step to generate a midpoint reference signal 122 and the step of subtracting of the midpoint reference signal 122 from the sampled receive signal 102 may be implemented digitally by the microprocessor 14 (FIG. 1) or other dedicated digital logic circuitry, or it may be performed prior to digitization using analog circuitry. The above-described functions may be carried out by the microprocessor 14 in response to a suitable set of program components contained in firmware.

As illustrated in FIG. 4, it may be difficult to discern the reflected echo pulse or pulses from the noise or ringing down present in the filtered signal 124. Accordingly, the present method and system includes autocorrelation to locate the reflected echo pulses, and thereby determine the echo distance to the reflective surface 4 (FIG. 1).

Figure 5:
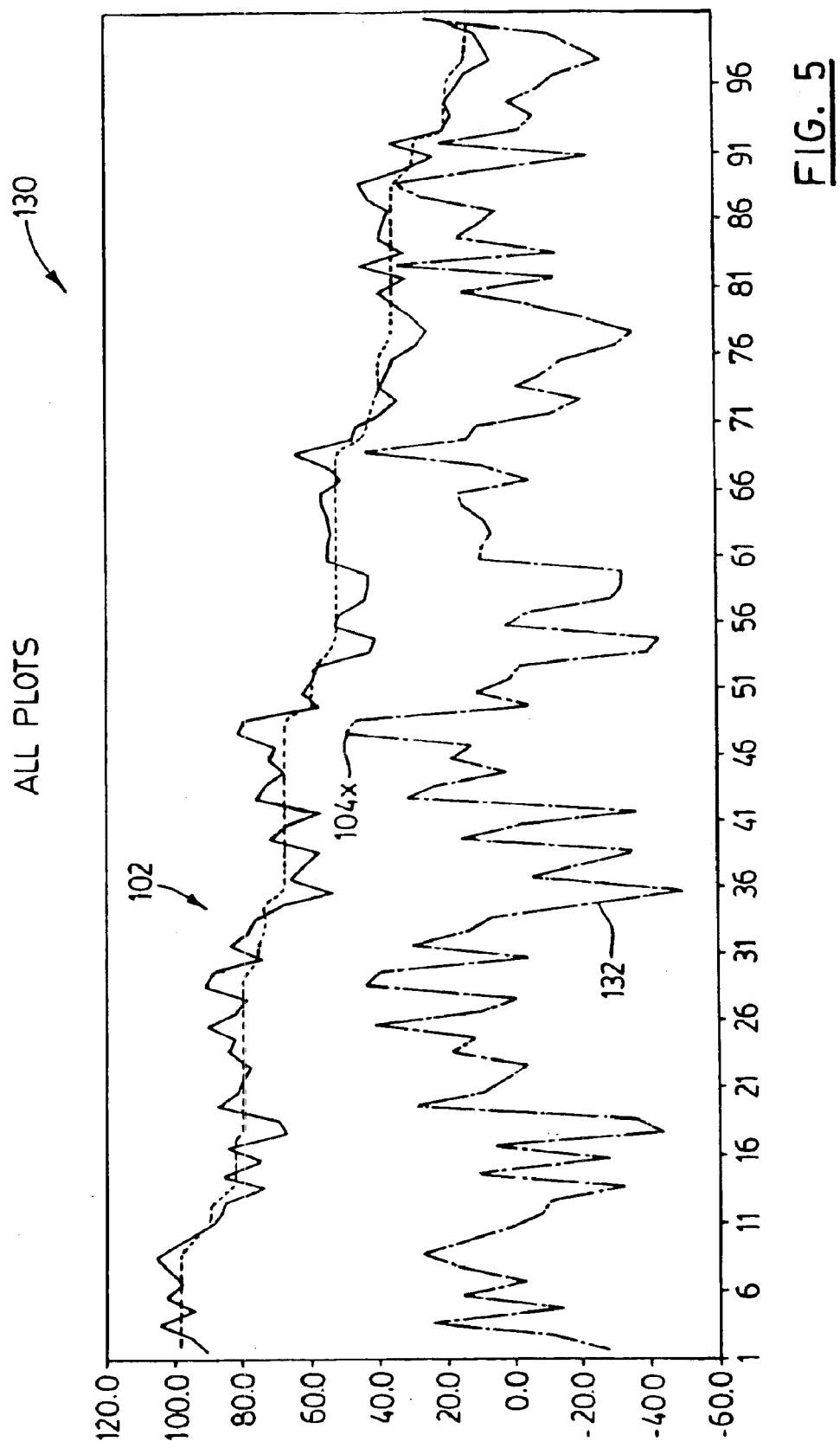
FIG. 5 shows a graph of the amplitude of a gain-controlled filtered signal.

Reference is now made to FIG. 5, which shows a graph 130 of the amplitude of a gain-controlled filtered signal 132 generated from the sampled receive signal 102. The gain-controlled filtered signal 132 is the filtered signal 124 (FIG. 4) multiplied by a multiplication factor so as to amplify the effect of the peaks 104 and troughs 106. In one embodiment, the multiplication factor is selected on the basis that it would cause the highest peak 104x to have a pre-determined amplitude, such as 50 dB. The microprocessor 14 (FIG. 1) identifies the highest peak 104x in the filtered signal 124 (FIG. 4) by finding the largest sample value in the data for the filtered signal 124. It then determines what multiplication factor is needed to increase that sample value to the pre-determined amplitude. Having determined the multiplication factor, the microprocessor 14 multiplies each of the sample values in the filtered signal 124 by the multiplication factor to create the gain-controlled filtered signal 132. Other methods of manipulating the data to provide gain-control may be utilized.

The microprocessor 14 (FIG. 1) then performs an auto-correlation operation upon the gain-controlled filtered signal 132. The autocorrelation operation includes creating a correlation signal from the addition of the gain-controlled filtered signal 132 and a copy of the gain-controlled filtered signal 132 shifted by a time unit. In one embodiment, the time unit is a single sample. Thus, the correlation signal would comprise the point-by-point addition of the values from the gain-controlled filtered signal 132 and the values from the gain-controlled filtered signal 132 shifted one point to the right. Mathematically, this may be expressed as:

$$C(t)=s(t)+s(t-1) \qquad (1)$$

where C(t) is the correlation signal and s(t) is the gain-controlled filtered signal.

The microprocessor 14 (FIG. 1) identifies the maximum peak value in the correlation signal C(t). It then repeats the process of creating a correlation signal using a further shifted gain-controlled filtered signal 132. It continues this process over a pre-determined range of shifts. The pre-determined range may be based upon the length of time that it would take an echo pulse to be received at the transducer if the tank 1 (FIG. 1) being measured contained no liquid 2 (FIG. 1). Using a predetermined range of 22 samples as an example, the set of correlation signals may be expressed as:

$$C_n(t)=s(t)+s(t-n) \text{ for } n=1 \text{ to } 22 \qquad (2)$$

For each shift n, the microprocessor 14 (FIG. 1) notes the maximum peak value of the correlation signal $C_n(t)$. For example, based upon the gain-controlled filtered signal 132 shown in FIG. 5, a set of maximum peak values for the range n=1 to 22 may be calculated as follows:

| Shift | Max Peak Value |
|---|---|
| 1 | 135.77 |
| 2 | 130.47 |
| 3 | 141.98 |
| 4 | 92.19 |
| 5 | 106.50 |
| 6 | 108.96 |
| 7 | 95.08 |
| 8 | 118.26 |
| 9 | 122.24 |
| 10 | 71.77 |
| 11 | 87.84 |
| 12 | 94.87 |
| 13 | 125.34 |
| 14 | 100.47 |
| 15 | 68.94 |
| 16 | 88.67 |
| 17 | 119.27 |
| 18 | 134.52 |
| 19 | 102.99 |
| 20 | 171.40 |
| 21 | 111.49 |
| 22 | 128.69 |

In the above example, the highest maximum peak value occurs at sample 20, where the maximum peak value of the correlation signal $C_{20}(t)$ reaches 171.40. The highest maximum peak value indicates that the correlation strength is highest when the copy of the gain-controlled filtered signal 132 is shifted by 20 samples. This correlation strength is indicative of a shift corresponding to the location of the echo pulse within the gain-controlled filtered signal 132.

Accordingly, the time of flight for the echo pulse may be determined based upon the number of shifts multiplied by the sampling rate. For example, if the sampled receive signal 102 (FIG. 2) has been sampled every 8 microseconds, then the time of flight would be 8 microseconds multiplied by 20 samples, or 0.16 milliseconds. This calculation provides the round-trip time for the pulse to be reflected to the transducer, so it may be halved to arrive at a travel time of 0.08 milliseconds from the transducer 12 (FIG. 1) to the reflective surface 4 (FIG. 1). If the speed of sound in the media through which the pulse is travelling is known, then the distance to the reflective surface 4 is easily calculated.

The above-described steps of filtering and autocorrelation may be carried out by the microprocessor 14 (FIG. 1) under the control of one or more program components, which may be implemented within firmware.

Figure 6:
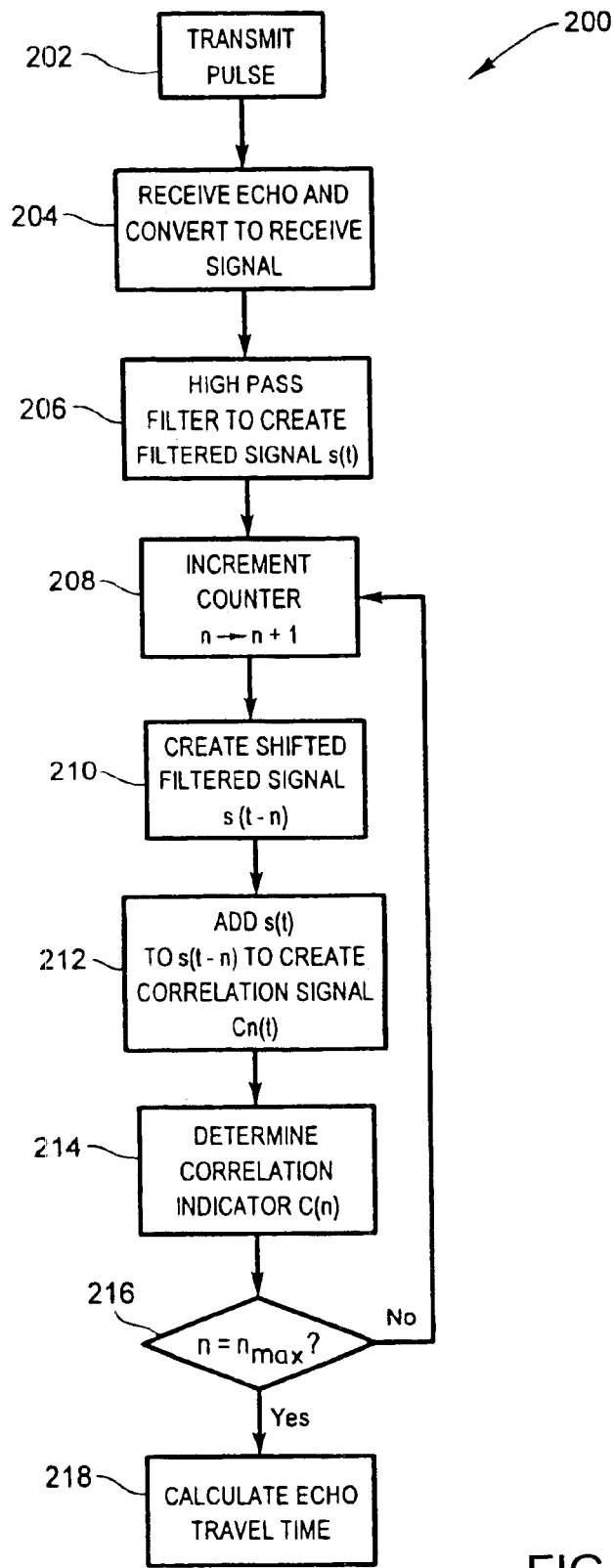
FIG. 6 shows a flowchart illustrating the steps of a method according to the present invention.

Reference is now made to FIG. 6, which shows a flowchart illustrating the steps of a method 200 according to the present invention. The method 200 begins in step 202 with the transmission of a pulse by a level measurement device towards a reflective surface. In step 204, an echo is received at the level measurement device and converted into a receive signal 102 (FIG. 4). The receive signal 102 may be digitized by an A/D converter (step not shown).

Once the receive signal 102 has been obtained in step 204, the microprocessor 14 (FIG. 1) high pass filters the receive signal 102 to create a filtered signal 124. The microprocessor 14 may scale the filtered signal 124 through applying a gain-controlled multiplication factor to the filtered signal 124 (step not shown). The microprocessor 14 then increments a counter n in step 208. The counter n is initially set to zero during an initialization step (not shown).

At step 210, the microprocessor 14 creates a shifted filtered signal s(t−n) by shifting the filtered signal 124 (FIG. 4) by the value of the counter n. In step 212, the microprocessor 14 adds the shifted filtered signal s(t−n) to the unshifted filtered signal s(t) to create a correlation signal $C_n(t)$. Then in step 214, the microprocessor 14 identifies a correlation indicator C(n) based upon the correlation signal $C_n(t)$, such as the maximum peak value of the correlation signal $C_N(t)$. At step 216, the microprocessor 14 assesses whether the counter n has reached its maximum value $n_{max}$. If not, then the method 200 returns to step 208 where the microprocessor 14 increments the counter n once more and repeats steps 210, 212 and 214. If the counter n has reached its maximum value $n_{max}$, then the method 200 proceeds to step 218 where the microprocessor 14 determines the echo travel time based upon the set of correlation indicators C(n). Of course, from the echo travel time, the microprocessor 14 may also calculate the echo distance and, from that, the level of the liquid 2 (FIG. 2) in the tank 1 (FIG. 1).

It will be apparent to those of ordinary skill in the art that some steps of the method 200 described above may be performed in other sequences.

Other methods of assessing the correlation strength of the correlation signals $C_n(t)$ may be used in place of the maximum peak value of the correlation signals, such as the average peak value or other indicia of correlation.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for echo processing in a pulse echo level measurement system, said level measurement system having a transducer for transmitting pulses and receiving echoes and including a receiver for converting the received echoes into corresponding received signals, said method comprising the steps of:

(a) transmitting a transmit pulse to a reflective surface;

(b) receiving an echo and converting the echo into a receive signal, said receive signal having a plurality of peaks;

(c) high-pass filtering said receive signal to create a filtered signal;

(d) creating a correlation signal from the addition of said filtered signal to a copy of said filtered signal shifted by a time unit;

(e) identifying a correlation indicator of said correlation signal;

(f) repeating steps (d) and (e) for a range of time units to generate a set of said correlation signals and correlation indicators; and (g) selecting an echo time based upon a maximum correlation as determined by one of said correlation indicators, said echo time corresponding to the time shift at which said maximum correlation occurs, and said echo time indicating the echo distance travel time.

2. The method claimed in claim 1, wherein said correlation indicator corresponds to the maximum peak value of said correlation signal.

3. The method claimed in claim 2, wherein said maximum correlation is determined by the highest of said maximum peak values.

4. The method claimed in claim 1, further including a step of sampling said receive signal.

5. The method claimed in claim 4, wherein said range of time units includes a sequence of time units each corresponding to a sample point, and said step (d) is performed using said filtered signal iteratively shifted by said sequence of time units.

6. The method claimed in claim 5, wherein said step of sampling defines a sampling interval and said sample points include a first sample point taken one sampling interval following said step of transmitting.

7. The method claimed in claim 4, wherein said step of sampling includes digitizing said receive signal.

8. The method claimed in claim 1, wherein said step of creating a correlation signal includes adding said filtered signal to a plurality of said filtered signals each shifted by a time shift.

9. A pulse-echo acoustic ranging system comprising:

(a) a transducer for emitting acoustic pulses and detecting reflected echoes;

(b) a controller having a receiver component and a transmitter component;

(c) said transducer having an input port operatively coupled to said transmitter component and being responsive to said transmitter component for emitting said acoustic pulses, and said transducer including an output port operatively coupled to said receiver component for outputting reflected echoes coupled by said transducer, (d) said receiver component converting said reflected acoustic pulses into a receive signal, said receive signal having a plurality of peaks and troughs;

(e) said controller including a first program component for creating a plurality of correlation signals by adding said filtered signal to a copy of said filtered signal shifted by a plurality of time units, a second program component for identifying a correlation indicator of each of said correlation signals, and a third program component for selecting an echo time based upon a maximum correlation as determined by one of said correlation indicators, said echo time being the time shift at which said maximum correlation occurs, and whereby the selected time indicates the echo distance travel time.

10. The system claimed in claim 9, wherein said correlation indicator corresponds to the maximum peak value of said correlation signal.

11. The system claimed in claim 10, wherein said maximum correlation is determined by the highest of said maximum peak values.

12. The system claimed in claim 9, further including a sampling component for sampling said receive signal.

13. The system claimed in claim 12, wherein said plurality of time units includes a sequence of time units each corresponding to a sample point.

14. The system claimed in claim 13, wherein said sampling component defines a sampling interval and said sample points include a first sample point taken one sampling interval following emission of an acoustic pulse.

15. The system claimed in claim 12, wherein said sampling component includes a digitization component for digitizing said receive signal.

16. The system claimed in claim 9, further including a high-pass filter component for filtering said receive signal.

* * * * *